United States Patent
Arya

(10) Patent No.: US 7,283,330 B2
(45) Date of Patent: Oct. 16, 2007

(54) METHOD OF MANUFACTURING A SUSPENSION USING COINING

(75) Inventor: Satya Prakash Arya, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 765 days.

(21) Appl. No.: 10/132,844

(22) Filed: Apr. 25, 2002

(65) Prior Publication Data

US 2003/0202282 A1    Oct. 30, 2003

(51) Int. Cl.
G11B 5/48    (2006.01)
G11B 5/127    (2006.01)

(52) U.S. Cl. ............... 360/244.2; 360/244.5; 360/244.9; 360/245; 29/603.07

(58) Field of Classification Search ............ 360/244.2, 360/244.9, 244.5, 244.8, 245; 72/342.1, 72/325, 332, 359, 21; 29/603.07
See application file for complete search history.

(56) References Cited

U.S. PATENT DOCUMENTS

| | | | |
|---|---|---|---|
| 4,601,186 A | | 7/1986 | Künzli et al. ............ 72/21 |
| 4,825,680 A | | 5/1989 | Coe et al. ............ 72/359 |
| 5,126,904 A | * | 6/1992 | Sakurai ............ 360/244.2 |
| 5,282,103 A | * | 1/1994 | Hatch et al. ............ 360/245 |
| 5,297,413 A | * | 3/1994 | Schones et al. ............ 72/342.1 |
| 5,530,606 A | * | 6/1996 | Baasch et al. ............ 360/245.6 |
| 5,734,526 A | * | 3/1998 | Symons ............ 360/244.3 |
| 5,812,342 A | * | 9/1998 | Khan et al. ............ 360/244.9 |
| 5,850,320 A | * | 12/1998 | Warmka et al. ............ 360/245.2 |
| 5,877,920 A | | 3/1999 | Resh ............ 360/104 |
| 5,894,655 A | * | 4/1999 | Symons ............ 29/603.03 |
| 5,923,500 A | * | 7/1999 | Hagen ............ 360/245.3 |
| 6,145,365 A | | 11/2000 | Miyahara ............ 72/332 |
| 6,181,529 B1 | * | 1/2001 | Aoyagi et al. ............ 360/255 |
| 6,191,921 B1 | * | 2/2001 | Hanrahan et al. ............ 360/135 |
| 6,196,042 B1 | | 3/2001 | Distefano et al. ............ 72/325 |
| 6,210,514 B1 | | 4/2001 | Cheung et al. ............ 156/241 |
| 6,219,203 B1 | * | 4/2001 | Arya et al. ............ 360/244.2 |
| 6,246,546 B1 | * | 6/2001 | Tangren ............ 360/245.1 |
| 6,301,081 B1 | * | 10/2001 | Fahey ............ 360/255 |
| 6,373,663 B1 | * | 4/2002 | Coon ............ 360/245.5 |
| 6,617,542 B2 | * | 9/2003 | Hayen et al. ............ 219/121.69 |
| 6,632,310 B2 | * | 10/2003 | Freeman et al. ............ 156/182 |
| 6,731,466 B2 | * | 5/2004 | Arya ............ 360/244.3 |
| 6,900,966 B1 | * | 5/2005 | Xu ............ 360/244.9 |

* cited by examiner

*Primary Examiner*—Brian E. Miller
(74) *Attorney, Agent, or Firm*—Walter W. Duft

(57) ABSTRACT

A method of manufacturing a suspension member designed to carry a slider and read/write head elements in a magnetic data storage device. The method includes forming the suspension member into a desired length and width configuration with a nominal thickness dimension. One or more pockets are formed in one or both surfaces of the suspension member. The pockets are treated by way of punch-coining or roll-coining to minimize pocket depth tolerances and introduce hardness and strength into surface areas of said pockets.

12 Claims, 6 Drawing Sheets

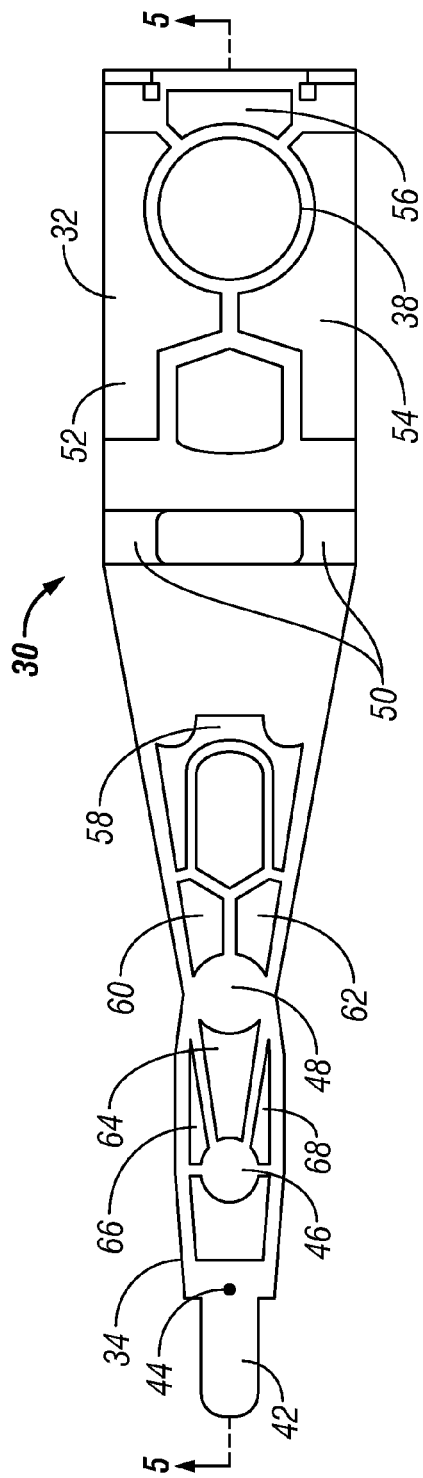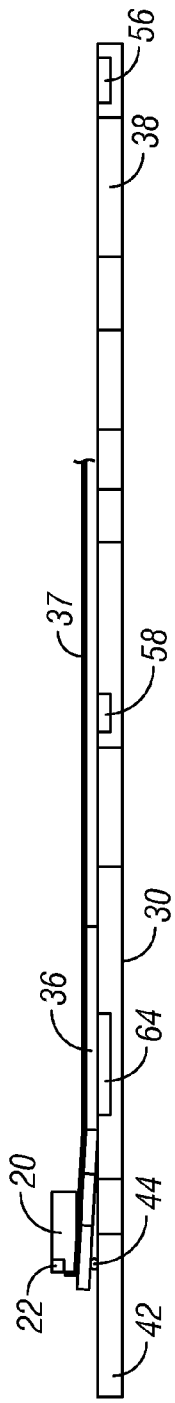
FIG. 4
FIG. 5

METHOD OF MANUFACTURING A SUSPENSION USING COINING

BACKGROUND OF THE INVENTION

1. Field of the Invention

The present invention relates to data storage apparatus for magnetically read and writing information on data storage media. More particularly, the invention concerns the fabrication of suspension assemblies designed to carry read/write heads in magnetic disk drive storage devices.

2. Description of the Prior Art

By way of background, a read/write head of a magnetic disk drive storage device ("disk drive") is typically incorporated on an air bearing slider that is designed to fly closely above the surface of a spinning magnetic disk medium during drive operation. The slider is mounted at the end of a suspension assembly that in turn is cantilevered from the arm of a pivotable actuator. When energized, the actuator sweeps the suspension across the spinning disk surface, allowing the read/write head to read and write data in a series of concentric tracks.

The suspension of a conventional disk drive typically includes a relatively stiff load beam whose base end is attached to the actuator arm and whose free end mounts a flexure that carries an associated slider and its integrated read/write head in a gimbaled configuration. The load beam suspends and loads the read/write head toward the spinning disk surface and the flexure allows the read/write head to pitch and roll in order to adjust its orientation for unavoidable disk surface run out or flatness variations. These components are quite small. A typical suspension is about 11-22 mm in length. The load beam typically has a thickness of between about 0.03-0.1 mm and the flexure typically has a thickness of between about 0.02-0.03 mm. The slider is typically about 1.25 mm×1.00 mm×0.30 mm, and the read/write head carried thereon is a fraction of that size.

A design requirement of a disk drive suspension load beam is that it be compliant in the vertical bending direction (normal to the disk surface) to facilitate proper gram loading of the slider and read/write head relative to the supportive air bearing force. At the same time, the load beam must be relatively stiff in the horizontal direction (parallel to the disk surface) to prevent off-track sway misalignment. It must also be torsionally stiff to prevent off-track misalignment due to rotational displacement. In addition to these static structural requirements, the load beam must have good dynamic characteristics to prevent unwanted vibration and flutter. Excessive gain caused by resonance at critical dynamic frequencies can induce unwanted torsion, sway and bending, all of which can contribute to track misalignment problems, excessive noise, and undue wear. Dynamic design considerations have become particularly acute as recording density and TPI (Tracks Per Inch) requirements continue to increase. This has necessitated high track servo bandwidths, which in turn has established a need for higher dynamic performance suspensions.

Disk drive suspension load beams have been conventionally formed from stainless steel sheet stock that is cold rolled to its desired thickness using a rolling reduction technique. The cold rolling produces a thin load beam material with high hardness and strength, and having a substantially uniform thickness throughout its length and width. More recently, photo-chemical partial etching has been employed to form pockets of reduced thickness in the rolled material. The goal of this effort is to improve load beam dynamic characteristics by reducing weight and inertia as much as possible without sacrificing the required static and dynamic stiffness characteristics. In general, partial etching allows a load beam to perform much better than conventionally rolled load beams that have not been etched. This approach has also been found to offer a great deal of design freedom because many elaborate pocket geometries can be formed, thereby allowing dynamic characteristics to be fine-tuned by distributing load beam mass and stiffness in strategic fashion.

Notwithstanding its advantages, photo-chemical etching generates excessive tolerances in the vertical direction (e.g., 2-4 times that of rolled material). This can produce unacceptable variations in gram loading and torsional dynamic characteristics. The problem is that the tolerances required to produce satisfactory pocket depth uniformity are at the process limits of photo-chemical etching. Although the depth of material removed is substantially a linear function of the length of time the metal is exposed to the chemical etching solvent, there are a number of variables that affect the ability to precisely control the amount of metal removed. Such variables include temperature, chemical contamination, chemical solvent concentration, impurities in both solvent and metal, and initial metal thickness.

An additional problem associated with partial etching is its tendency to relieve the internal stresses that are locked into the steel material during the cold rolling reduction process. This stress relief may cause an unacceptable lowering of load beam strength in the etched areas.

Accordingly, an improved manufacturing method is needed that addresses the above-described load beam construction issues. What is particularly required is a manufacturing method that allows the advantages of load beam partial etching to be preserved while avoiding its attendant disadvantages.

SUMMARY OF THE INVENTION

The foregoing problems are solved and an advance in the art is obtained by an improved method of manufacturing a suspension member, such as a load beam, designed to carry a read/write head in a data storage device. According to exemplary implementations of the inventive method, the suspension member is formed into a desired length and width configuration with a nominal thickness dimension. One or more pockets are formed in a surface of the suspension member. The pockets are treated to minimize pocket depth tolerances and introduce hardness and strength into surface areas of said pockets.

Treatment of the pockets preferably includes applying a compressive force on the pockets in excess of a bearing strength of the material used to form the suspension member. The minimal pocket depth tolerances provided by the treatment are preferably equal to or better than the thickness tolerances associated with conventionally rolled material. In this way, variations in vertical stiffness and gram loading will be minimized. Variations in dynamic frequency characteristics will also be minimized. Any excess material in the pockets will flow in a controlled desired direction that has the least impact on performance, namely in the length and width directions and not in the thickness direction, which is maintained. The treatment will also preferably cold work the suspension member material and any strength lost as a result of previous processing, such as etching, will be partially or wholly restored.

In one embodiment of the invention, the pockets are formed using chemical etching, and then treated using a punch-coining process. In another embodiment of the invention, the pockets are etched and treated by roll-coining the suspension member using a roller having raised coining elements thereon.

The pockets may be formed on one or both sides of the suspension member. If the pockets are formed only on one side of the suspension member, and if a punch-coining treatment is used, the pockets can be coined using a coining punch and a support die sandwiching the suspension member. If the pockets are formed on two sides of the suspension member, and if a punch-coining treatment is used, the pockets can be coined using a first coining punch and second coining punch sandwiching the suspension member.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 4 is a plan view of a load beam that is formed in accordance with the invention;

FIG. 5 is a cross-sectional view taken along line 5-5 in FIG. 4 and showing the load beam of FIG. 4 in combination with a flexure and slider assembly;

DETAILED DESCRIPTION OF PREFERRED EMBODIMENTS

Figure 1:
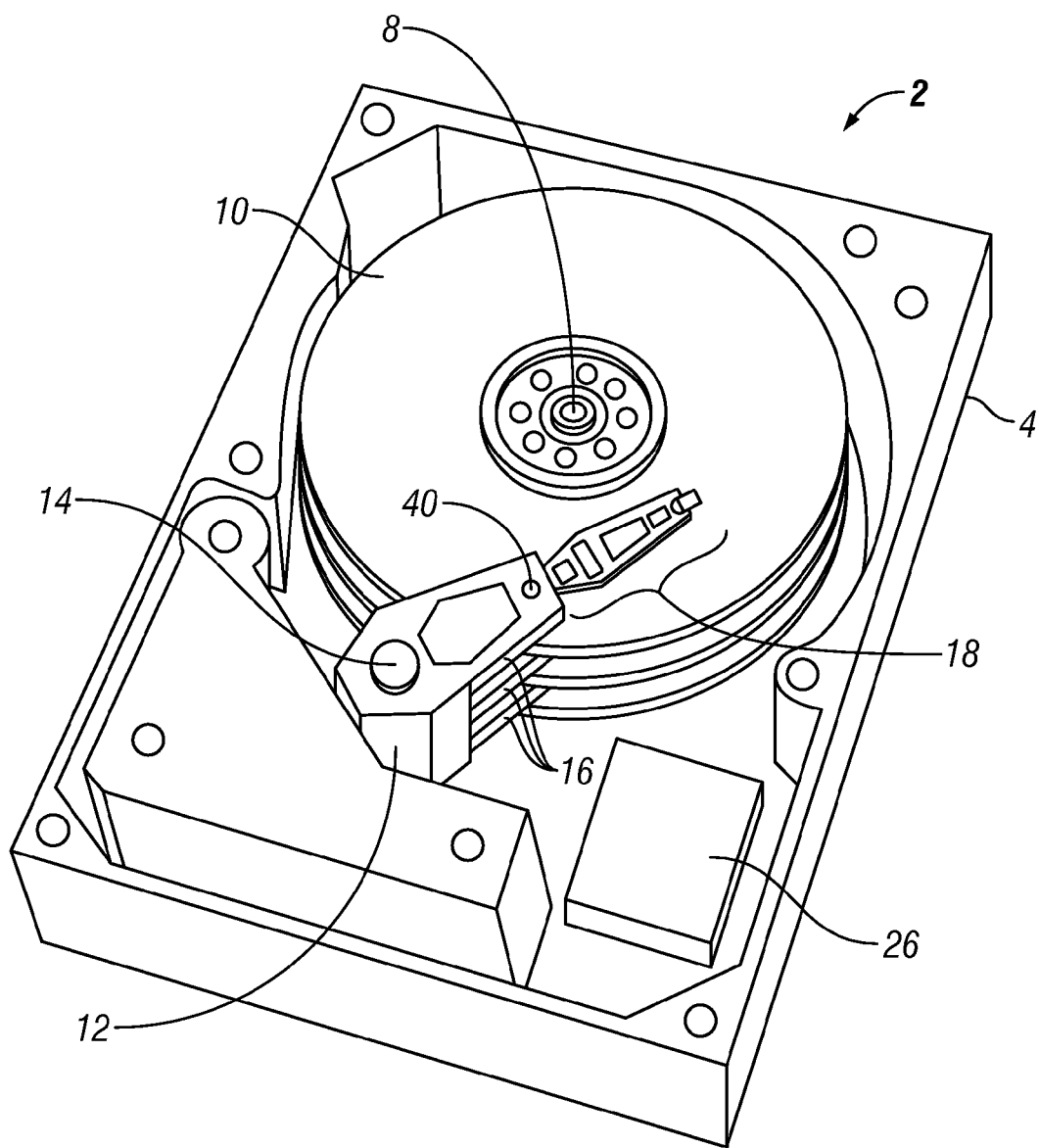
FIG. 1 is an interior perspective view of a magnetic disk drive that incorporates a read/write head suspension load beam fabricated in accordance with the invention.
Figure 2:
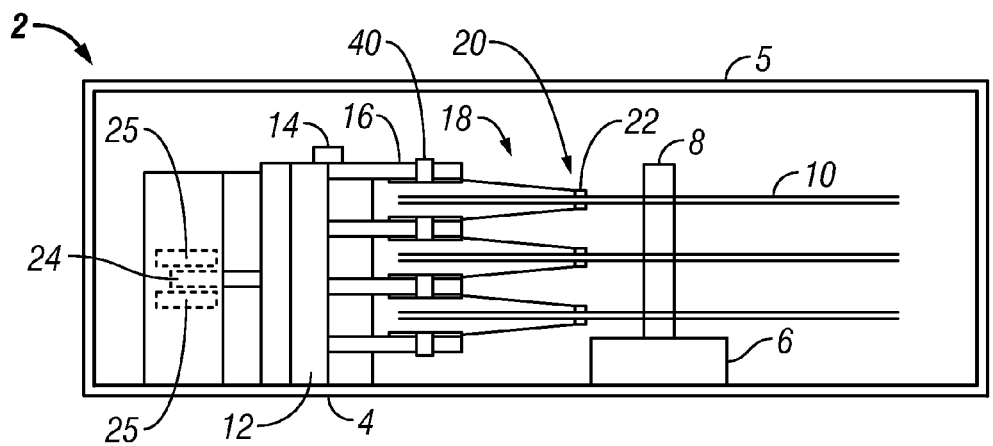
FIG. 2 is a simplified vertical sectional view of the magnetic disk drive of FIG. 1.
Figure 3:
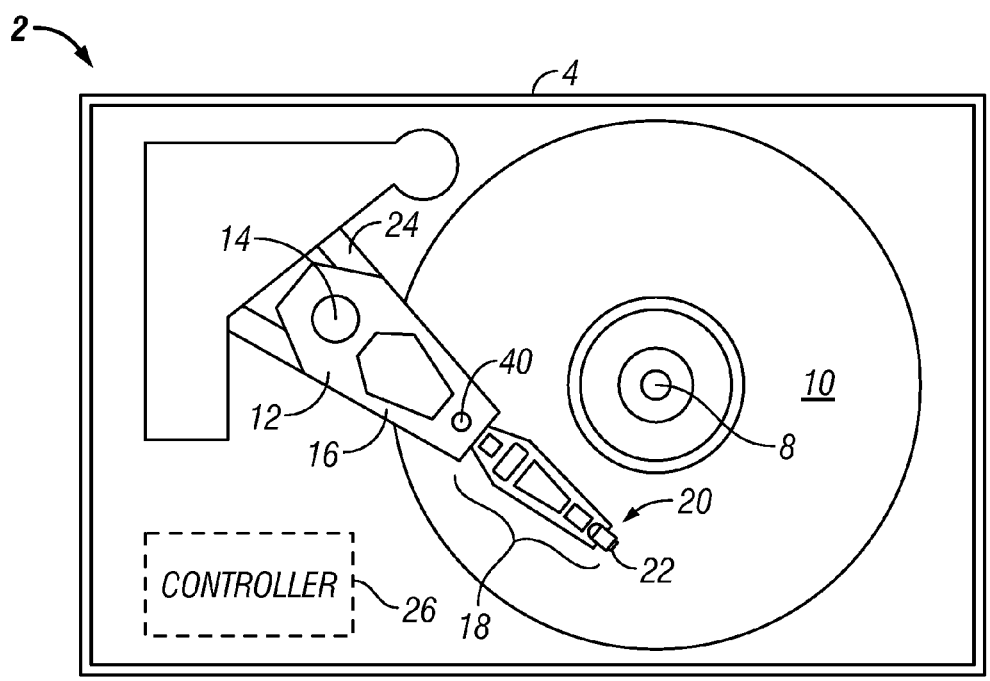
FIG. 3 is a simplified horizontal sectional view of the disk drive of FIG. 1.

Turning now to the figures, wherein like reference numerals represent like elements in all of the several views, FIGS. 1-3 illustrate a disk drive 2 having a suspension load beam (described below) that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes rigid actuator arms 16 that each carry one or two flexible suspensions 18. Each suspension 18 supports an air bearing slider 20 having a read/write transducer 22. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

With the possible exception of the lowermost disk 10, there is preferably one transducer 22 associated with each of the upper and lower surfaces of the disks 10 (see FIG. 2). This means that each such disk surface is available for data storage. The transducers 22 are positionable to read and write data anywhere on the disk surfaces by pivoting the actuator 12 about the pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 2 and 3) that is driven by a pair of motor magnets 25 (see FIG. 2).

When the disk drive 2 is powered on, the disks 10 spin up to a desired rotational speed, such as 7400 rpm, 10,000 rpm or higher. This causes an upward air bearing force to develop between the disk surfaces and the sliders 20. This upward air bearing force is counteracted by the downward gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals, which carry both data and transducer position control information, are sent to the disk drive controller, shown diagrammatically at 25, for conventional processing. The controller 25 also generates write data signals during data write operations. The write data signals are delivered via circuitry carried by the actuator arms 16 and suspensions 18 to the write head elements of the transducers 22 for writing data onto the disks 10.

It will be appreciated that the foregoing description of the disk drive 2 is exemplary in nature, and that many other design configurations would be possible while still utilizing the manufacturing method of the invention.

Turning now to FIGS. 4 and 5, the principles of the invention will be presented with reference to an exemplary suspension load beam 30 having a configuration that has been selected for purposes of illustration only and not by way of limitation. In the configuration of FIGS. 4 and 5, the load beam 30 includes a base end 32 adapted for mounting to one of the actuator arms 16 of FIGS. 1-3. The load beam 30 likewise includes a distal tip end 34 adapted for mounting to a flexure 36. As shown in FIG. 5, the flexure 36 carries the slider 20 and the read/write transducer 22 of FIGS. 1-3. The design of the flexure 36 is assumed to be conventional in nature, and thus includes, among other things, a conductive layer providing electrical lead traces 37.

The load beam's base end 32 includes a large attachment aperture 38 that allows the load beam 30 to be attached to its associated actuator arm 16 by way of a conventional swage or rivet connector 40 (see FIGS. 1-3). The load beam's tip end 34 includes a tab 42 that is used for merging the slider 20 over an associated one of the disks 10 and loading/unloading the slider during operation of the disk drive 2. The tip end also includes a dimple 44 located prior to the tab 42 for gimbaling the flexure 36. Disposed between the load beam's base end 32 and tip end 34 are attachment pad locations 46 and 48 for securing the flexure 36 to the load beam. Closer to the base end 32, a hinge 50 is provided to allow the load beam 30 to bend in the vertical direction (i.e., normal to the disk surface).

Throughout the length of the load beam 30, there are a number of pockets of various size and shape. These pockets do not extend all the way through the load beam 30, but only partially through its thickness. At the load beam's base end 32, there are two large pockets 52 and 54, and a smaller pocket 56. Toward the load beam's tip end 34 there are additional pockets 58, 60, 62, 64, 66 and 68. Each of the foregoing pockets is designed for purposes of weight reduction, static strength and dynamic characteristics relative to a particular load beam application. As such, their size, shape and number will typically vary from one suspension design to another.

Turning now to the manufacture of the load beam 30, it will be observed that the structure is configured to be generally flat and rigid. As such, it can be made from a single roll-formed sheet of stainless steel or other high strength material. In the alternative, the load beam 30 could be formed from a multilayer clad material. The load beam 30 will typically have a nominal thickness of between about 0.03-0.1 mm, and preferably about 0.05-0.1 mm. As indicated, the load beam 30 can be roll formed using a conventional roll reduction technique to achieved the desired nominal thickness. Thereafter, the rolled material can be formed into a desired length and width configuration having the nominal thickness dimension of the rolled material. The load beam 30 can then be die formed to produce the dimple 44, as well as other design features, such as a pair of rails (not shown) extending along the edges of the load beam tip end 34, including the tab 42. The rails can be conventionally formed by turning the edges of the load beam 30 out of the principal plane of the material, in a direction away from the flexure 36. This results in increased load beam bending stiffness.

The pockets 52-68 can be formed on one or both surfaces of the load beam 30. This will typically be done using a conventional pocket etching process of the type described by way of background above. The pockets are then treated in order to minimize pocket depth tolerances and introduce compressive stresses into areas surrounding the pockets. This treatment of the pockets involves the application of a compressive force onto the surfaces of the pockets in excess of a bearing strength of the material used to make the load beam 30.

Figure 6:
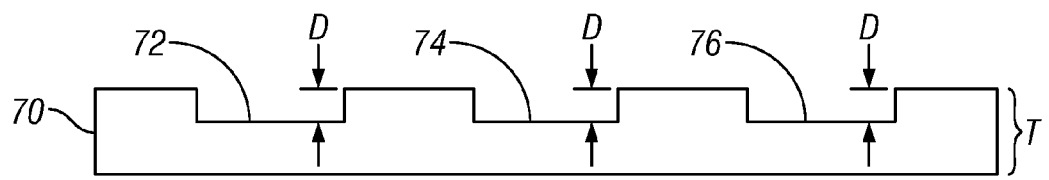
FIG. 6 is a diagrammatic side view of a suspension load beam to be formed in accordance with one aspect of the invention, following etching thereof.
Figure 7:
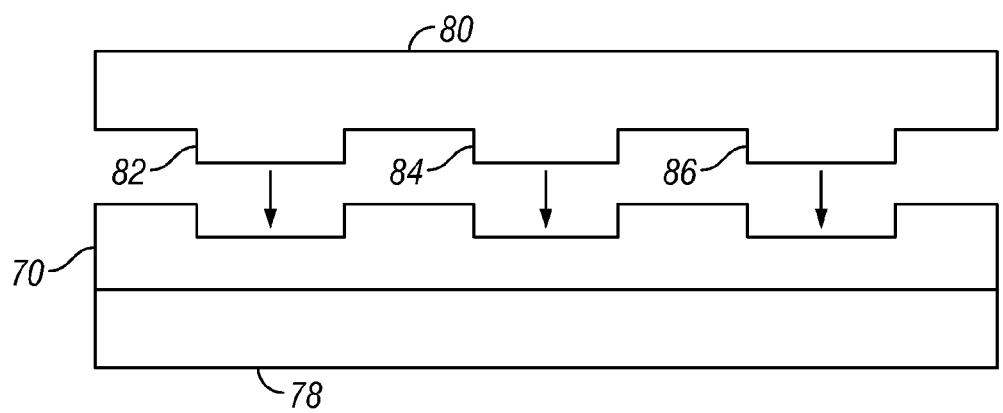
FIG. 7 is a diagrammatic exploded side view of the load beam of FIG. 6 in which the suspension member is undergoing a coining process in accordance with the invention.
Figure 8:
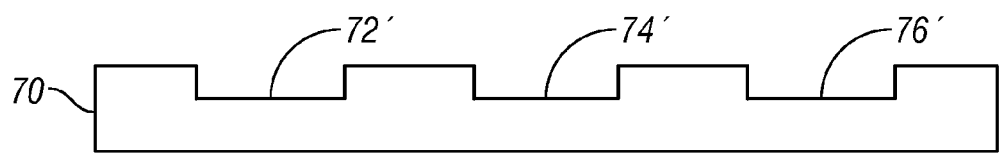
FIG. 8 is a diagrammatic side view of the load beam of FIG. 6 following the coining thereof in FIG. 7.

In one embodiment of the invention, the pockets are formed using chemical etching, and then treated using a punch-coining process. FIGS. 6-8 illustrate the punch-coining process relative to a sheet of load beam material 70 having a nominal thickness T. In FIG. 6, the load beam material 70 is shown following the partial etching of pockets 72, 74 and 76 to a target depth D. Due to the process limitations of the chemical etching process, the pocket depth value D will vary due to an associated depth tolerance. In many cases, the depth tolerance will be unacceptably high and will introduce variable or unstable gram load and dynamic frequency variations. In FIG. 7, the etched load beam material 70 is placed on a support die 78. A coining punch 80 having punch elements 82, 84 and 86 aligned and sized to fully engage the pockets 72, 74 and 76 is placed over the load beam material 70. With the load beam material 70 sandwiched between the support die 78 and the coining punch 80, a suitable compressive force is applied to coin the load beam material. As stated above, this compressive force is preferably in excess of the bearing strength of the load beam material 70, such that the surfaces of the pockets 72, 74 and 76 are cold worked and have high hardness and strength. These work hardened surfaces are shown at 72', 74' and 76' in FIG. 8. The compressive force must also be sufficient and so that substantially all of the pocket depth tolerances are minimized to some acceptable level, such as the thickness tolerances associated with the load beam material 70 following roll forming and prior to etching.

As stated, pockets may be formed on one or both sides of a load beam. If the pockets are formed only on one side of the load beam, and if a punch-coining treatment is used, the pockets can be coined using the support die 78 and the coining punch 80 shown in FIG. 7. If the pockets are formed on two sides of the load beam, and if a punch-coining treatment is used, the pockets can be coined according to the method of FIGS. 9-11.

Figure 9:
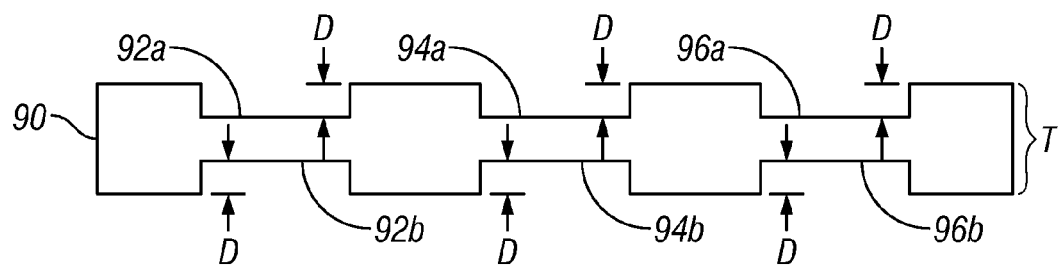
FIG. 9 is a diagrammatic side view of a suspension load beam to be formed in accordance with another aspect of the invention, following etching thereof.
Figure 10:
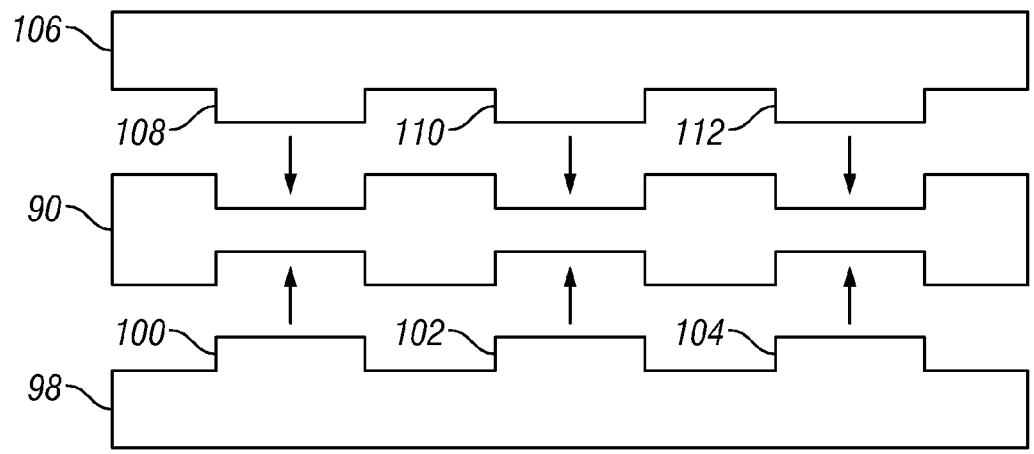
FIG. 10 is a diagrammatic exploded side view of the load beam of FIG. 9 in which the suspension member is undergoing a coining process in accordance with the invention.
Figure 11:
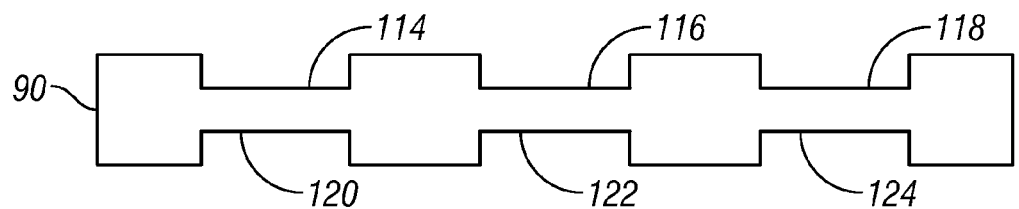
FIG. 11 is a diagrammatic side view of the load beam of FIG. 9 following the coining thereof in FIG. 10.

In FIG. 9, a load beam material 90 having a nominal thickness T is shown following the partial etching of upper pockets 92a, 94b and 96c, and lower pockets 92a, 92b, and 92c to a target depth D. Again, due to the process limitations of the chemical etching process, the pockets actually formed will have variable depth D due to an associated depth tolerance. In many cases, the depth tolerance will be unacceptably high and will introduce variable or unstable gram load and dynamic frequency variations. In FIG. 10, the etched load beam material 90 is placed on a first coining punch 96 having punch elements 100, 102 and 104 aligned and sized to fully engage the pockets 92b, 94b and 96b. A second coining punch 106 having punch elements 108, 110 and 112 aligned and sized to fully engage the pockets 92a, 94a and 96a is placed over the load beam material 90. With the load beam material 90 sandwiched between the first coining punch 96 and the second coining punch 106, a suitable compressive force is applied to coin the material. As stated above, this compressive force is preferably in excess of the bearing strength of the load beam material 90, such that the surfaces of the upper pockets 92a, 94a and 96a and the lower pockets 92b, 94b and 96b are cold worked and compressive stresses are introduced therein. These work hardened surfaces are shown at 114, 116, 118, 120, 124 and 126 in FIG. 11. As previously stated, the compressive force must also be sufficient and so that substantially all of the tolerances are minimized to some acceptable level, such as the thickness tolerances associated with the load beam material 70 following roll forming and prior to etching.

Figure 12:
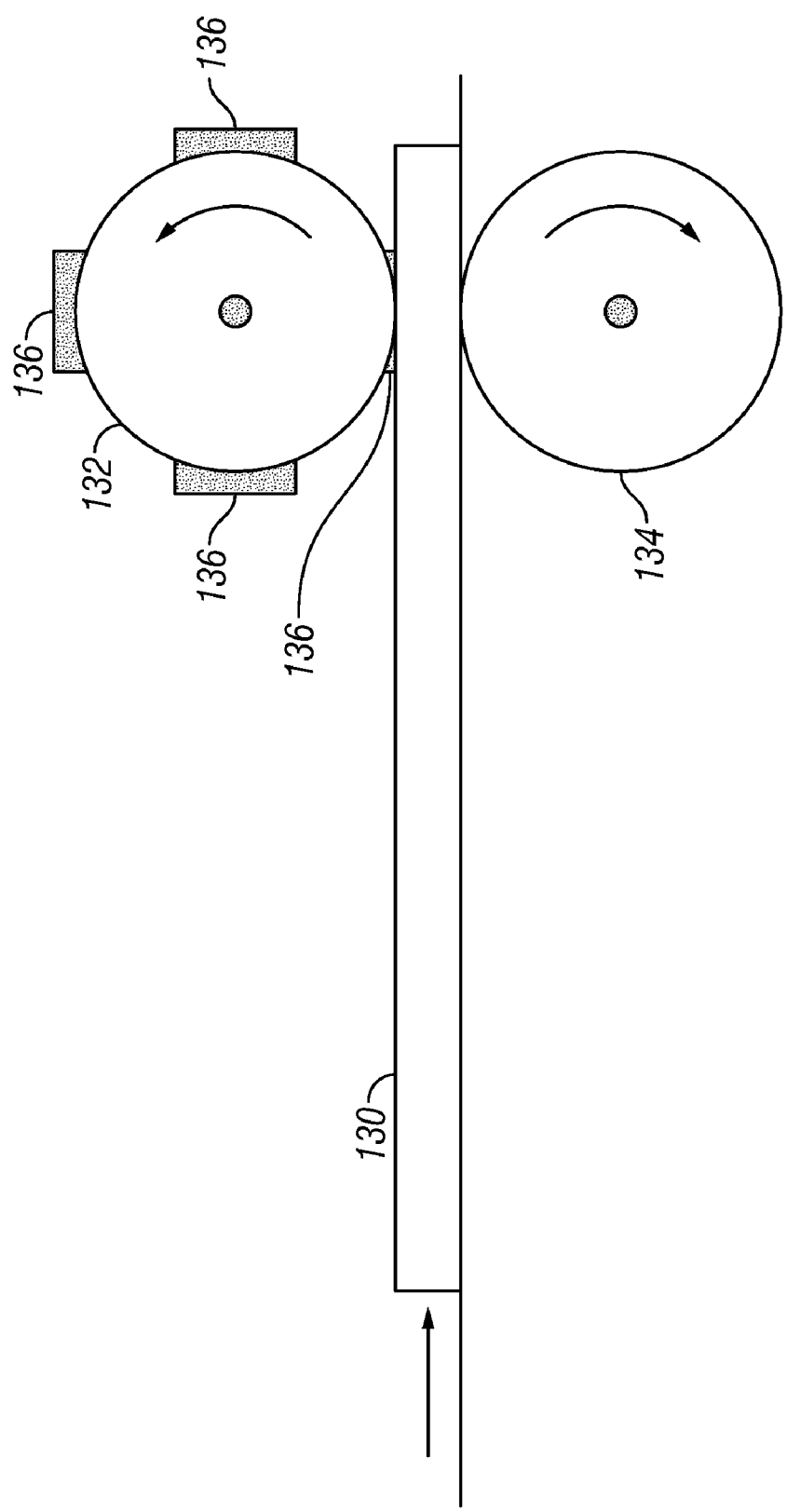
FIG. 12 is a diagrammatic side view of a suspension load beam being formed with treated pockets using a rolling process in accordance with the invention.

In another embodiment of the invention, shown in FIG. 12, the pockets are formed and treated by etching and then roll-coining the load beam. The roll-coining procedure is performed by rolling the etched load beam sheet stock (shown at 130 in FIG. 12) between a pair of rollers 132 and 134. One or both of the rollers 132 and 134 have raised coining elements 136 thereon that are configured to coin the etched pockets. The work piece can then be trimmed to the desired length and width dimensions.

The result of treating the pockets of a load beam according to the embodiments described above is to ensure that the thicknesses of the pockets are within tolerances that are equal or better than rolled material. In this way, variations in vertical stiffness and gram loading will be minimized. Variations in dynamic frequency characteristics will also be minimized. Any excess material in the pockets will flow in a controlled desired direction that has the least impact on performance, namely in the load beam length and width directions and not in the thickness direction, which is maintained. The treatment will also preferably cold work the load beam material and any strength lost as a result of previous processing such as etching will be partially or wholly restored.

Accordingly, method for manufacturing a suspension load beam has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method of manufacturing a disk drive suspension member, comprising:
    forming said suspension member into a desired length and width configuration with a nominal thickness dimension;
    forming plural pockets in a substantially flat main surface of said suspension member by removing material to a desired pocket depth below said suspension member main surface that is less than a thickness of said suspension member;
    each of said pockets having a pocket surface and a continuous side wall extending from said pocket surface to said suspension member main surface;
    said pocket surfaces being relatively flat within pocket depth tolerances created by said forming;
    said pockets being of varying size and shape according to a design that is selected to achieve desired suspension member weight reduction, static strength and dynamic characteristics; and
    selectively treating said pocket surfaces of said pockets, but not said suspension member main surface, with a compressive force to reduce said pocket depth tolerances until a desired pocket depth tolerance is reached that provides acceptable variations in vertical stiffness, gram loading and frequency characteristics of said suspension member, and to introduce hardness and strength into said pocket surfaces.

2. A method in accordance with claim 1 wherein said pocket forming step comprises chemically etching said pockets.

3. A method in accordance with claim 1 wherein said pocket treating step includes coining said pockets.

4. A method in accordance with claim 1 wherein said pocket forming step includes chemically etching said pockets and said pocket treating step includes punch-coining said pockets.

5. A method in accordance with claim 1 wherein said pocket forming step includes chemically etching said pockets and said pocket treating step includes roll-coining said pockets using a roller having raised coining elements formed thereon.

6. A method in accordance with claim 1 wherein said pocket forming step includes forming said pockets on one side of said suspension member.

7. A method in accordance with claim 6 wherein said pocket treating step includes coining said pockets using a coining punch and a support die sandwiching said suspension member.

8. A method in accordance with claim 7 wherein said pocket treating step includes coining said pockets using a first coining punch and a second coining punch sandwiching said suspension member.

9. A method in accordance with claim 1 wherein said pocket forming step includes forming said pockets on two sides of said suspension member.

10. A method in accordance with claim 1 wherein said pocket treating step includes applying a compressive force on said pockets in excess of a bearing strength of a material used to form said suspension member.

11. A method of manufacturing a disk drive suspension member, comprising:
    forming said suspension member into a desired length and width configuration with a nominal thickness dimension;
    forming plural pockets in a substantially flat main surface of said suspension member by removing material to a desired pocket depth below said suspension member main surface that is less than a thickness of said suspension member;
    each of said pockets having a pocket surface and a continuous side wall extending from said pocket surface to said suspension member main surface;
    said pocket surfaces being relatively flat within pocket depth tolerances created by said forming;
    said pockets being of varying size and shape according to a design that is selected to achieve desired suspension member weight reduction, static strength and dynamic characteristics; and
    selectively treating said pocket surfaces of said pockets, but not said suspension member main surface, with a compressive force by punch-coining to reduce said pocket depth tolerances until a desired pocket depth tolerance is reached that provides acceptable variations in vertical stiffness, gram loading and frequency characteristics of said suspension member, and to introduce hardness and strength into said pocket surfaces.

12. A method of manufacturing a disk drive suspension member, comprising:
    forming said suspension member into a desired length and width configuration with a nominal thickness dimension;
    forming plural pockets in a substantially flat main surface of said suspension member by removing material to a desired pocket depth below said suspension member main surface that is less than a thickness of said suspension member;
    each of said pockets having a pocket surface and a continuous side wall extending from said pocket surface to said suspension member main surface;
    said pocket surfaces being relatively flat within pocket depth tolerances created by said forming;
    said pockets being of varying size and shape according to a design that is selected to achieve desired suspension member weight reduction, static strength and dynamic characteristics; and
    selectively treating said pocket surfaces of said pockets, but not said suspension member main surface, with a compressive force by roll-coining to reduce pocket depth tolerances until a desired pocket depth tolerance is reached that provides acceptable variations in vertical stiffness, gram loading and frequency characteristics of said suspension member, and to introduce hardness and strength into said pocket surfaces.

* * * * *